(12) United States Patent
Bettonville et al.

(10) Patent No.: US 8,465,816 B2
(45) Date of Patent: Jun. 18, 2013

(54) POLYETHYLENE PIPE RESINS

(75) Inventors: Serge Jean Henri Bettonville, Lens Saint Servais (BE); Virgile Joel Maurice Rouyer, Brussels (BE)

(73) Assignee: INEOS Manufacturing Belgium NV, Antwerp (BE)

( * ) Notice: Subject to any disclaimer, the term of this patent is extended or adjusted under 35 U.S.C. 154(b) by 1182 days.

(21) Appl. No.: 10/561,796

(22) PCT Filed: Jun. 18, 2004

(86) PCT No.: PCT/EP2004/006806
§ 371 (c)(1),
(2), (4) Date: Dec. 21, 2005

(87) PCT Pub. No.: WO2005/005534
PCT Pub. Date: Jan. 20, 2005

(65) Prior Publication Data
US 2006/0154011 A1    Jul. 13, 2006

(30) Foreign Application Priority Data
Jul. 4, 2003    (GB) .................................. 0315685.8

(51) Int. Cl.
*C08L 23/04*    (2006.01)
*C08L 23/06*    (2006.01)

(52) U.S. Cl.
USPC .......... 428/35.7; 428/34.1; 138/118; 138/178

(58) Field of Classification Search
USPC ..... 526/65, 124.2, 160; 521/51, 43.5; 525/71, 525/400, 98, 240; 428/34.6, 318.4, 319.3, 428/35.7; 264/310, 45.1; 261/45.5; 138/118, 138/178
See application file for complete search history.

(56) References Cited

U.S. PATENT DOCUMENTS

| | | |
|---|---|---|
| 3,770,852 A | 11/1973 | Hager et al. |
| 6,541,592 B1 | 4/2003 | Inagaki et al. |
| 6,969,741 B2 * | 11/2005 | Lustiger et al. ............... 525/240 |
| 2004/0097650 A1 * | 5/2004 | Ogawa et al. .................. 525/98 |
| 2004/0191440 A1 * | 9/2004 | Funaki et al. ................ 428/34.6 |

FOREIGN PATENT DOCUMENTS

| | | | |
|---|---|---|---|
| EP | 1 201 713 A1 | | 5/2002 |
| EP | 1201711 A1 | * | 5/2002 |
| KR | 2003 049 193 A | | 6/2003 |
| WO | WO 2004/076501 A1 | | 9/2004 |

* cited by examiner

*Primary Examiner* — Ellen S Raudenbush
(74) *Attorney, Agent, or Firm* — Nixon & Vanderhye

(57) ABSTRACT

A pressure pipe resin is disclosed comprising from 90 to 99.9 wt %, based on the total weight of the resin, of a polyethylene, and from 0.1 to 10 wt %, based on the total weight of the blend, of an ionomer.

7 Claims, 2 Drawing Sheets

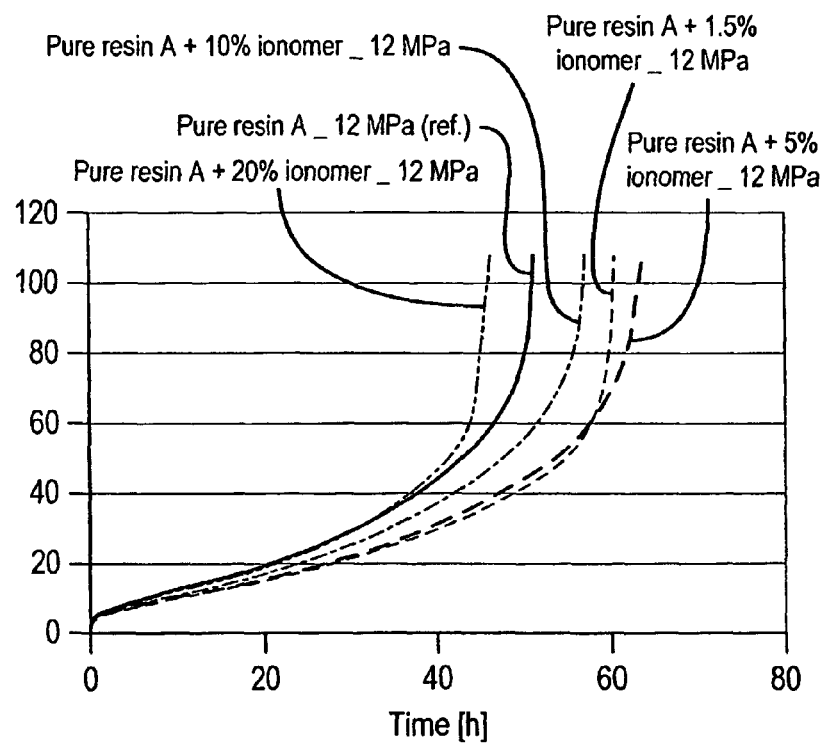
Fig.1 Tensile creep @ 23 °C - constant applied stress = 12 MPa

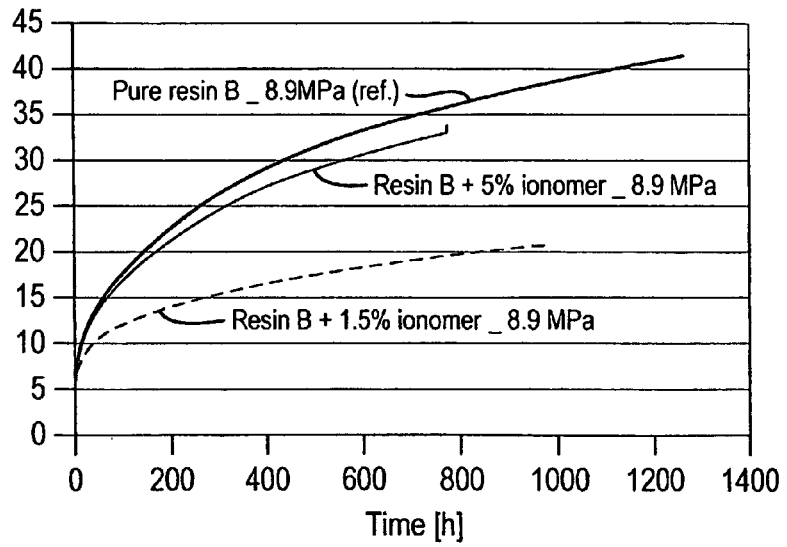
Fig.2 Tensile creep @ 40 °C - constant applied stress = 8.9 MPa
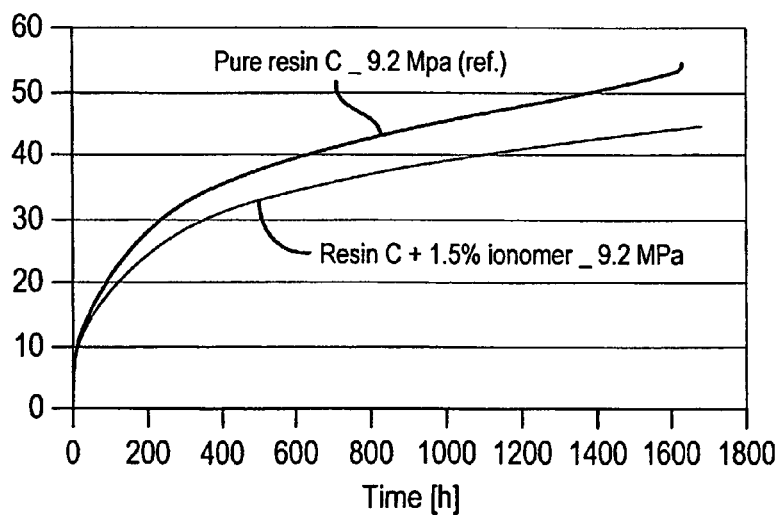
Fig.3 Tensile creep @ 40 °C - constant applied stress = 9.2 MPa

POLYETHYLENE PIPE RESINS

This application is the U.S. National Phase of International Application PCT/EP2004/006806, filed 18 Jun. 2004, which designated the U.S. PCT/EP2004/006806 claims priority to British Application No. 0315685.8 filed 4 Jul. 2003. The entire content of these applications are incorporated herein by reference.

The present invention relates to polyethylene resins, more particularly those suitable for use as pipe resins, and to a process for producing such resins. The present invention also relates to the use of polyethylene compounds comprising such resins for the manufacture of pipes and fittings, and to such pipes and fittings themselves.

BACKGROUND OF THE INVENTION

Polyethylene resins are known for the production of pipes and fittings. Pipe resins require high stiffness (creep rupture strength), combined with a high resistance against slow crack growth as well as resistance to crack propagation yielding impact toughness. However, there is the need to improve the creep rupture strength of currently available pipe resins, keeping the resistance against slow crack growth and the rapid crack propagation at least at a constant level. This would permit an increase in the pressure rating of such pipes.

Polyethylene pipes are widely used as they are lightweight and can be easily assembled by fusion welding. Polyethylene pipes also have a good flexibility and impact resistance, and are corrosion free. Unless polyethylene pipes are reinforced, they are however limited in their hydrostatic resistance by the inherent low yield strength of polyethylene. It is generally accepted that the higher the density of the polyethylene, the higher will be the long-term hydrostatic strength. Pipe resins are known in the art which are referred to by the names "PE 80" and "PE 100". These classifications are described in ISO 9080 and ISO 12162. Extrapolation according to ISO 9080 shows that they have an extrapolated 20° C./50 years stress at a lower prediction level (97.5% confidence level—"LPL") of at least 8 MPa [PE 80] and 10 MPa [PE 100]. The term "pressure pipe" in this specification refers to a pipe having a pressure rating of PE 80 and above.

There is a need in the art for polyethylene pipe resins which exceed the above test requirements. Currently, for polyethylene the highest hydrostatic strength which can be tolerated based on an extrapolation of the hoop stress/lifetime relationship at a temperature of 20° C. for a period of 50 years is an LPL of 10 MPa. This corresponds to a PE 100 resin. The density of the current basic powder used in the production of a PE 100 compound is close to 0.950 g/cm$^3$ (typically from 0.949 to 0.951 g/cm$^3$). Such polyethylene resins containing conventional amounts of black pigments have densities from about 0.958 to 0.960 g/cm$^3$. There is now a desire in the art to produce a resin which when transformed into the form of a pipe, is capable of withstanding an LPL stress of 12.5 MPa at a temperature of 20° C. for a period of 50 years. Using the current terminology in the art, such a resin would be known as a "PE 125 grade" resin. Currently no such resins are commercially available.

Certain bimodal polyethylene resins are known to have very good hydrostatic strength. For example, WO 02/34829 discloses a polyethylene resin comprising from 35 to 49 wt % of a first polyethylene fraction of high molecular weight and from 51 to 65 wt % of a second polyethylene fraction of low molecular weight, the first polyethylene fraction comprising a linear low density polyethylene having a density of up to 0.928 g/cm$^3$, and an HLMI of less than 0.6 g/10 min and the second polyethylene fraction comprising a high density polyethylene having a density of at least 0.969 g/cm$^3$ and an MI$_2$ of greater than 100 g/10 min, and the polyethylene resin having a density of greater than 0.951 g/cm$^3$ and an HLMI of from 1 to 100 g/10 min.

SUMMARY OF THE INVENTION

We have found that by incorporating an ionomer into polyethylene, it is possible to obtain resins with superior properties to those of equivalent known resins. Accordingly, in its broadest aspect the present invention provides a pressure pipe resin comprising from 90 to 99.9 wt %, based on the total weight of the resin, of a polyethylene, and from 0.1 to 10 wt %, based on the total weight of the blend, of an ionomer.

Preferably the polyethylene is multimodal. By "multimodal" polyethylene is meant polyethylene having at least two components of different molecular weights and compositions (ie comonomer content). More preferably the resin is bimodal, by which is meant that it comprises two components of different molecular weights, one having a higher relative molecular weight than the other of the two components and compositions (ie comonomer content). The resin usually has a density of at least 0.930 g/cm$^3$.

More preferably the pressure pipe resin comprises a blend of (a) a polyethylene resin comprising from 35 to 60 wt % of a higher molecular weight fraction having a density of up to 0.930 g/cm$^3$ and from 40 to 65 wt % of a lower molecular weight fraction having a density of at least 0.965 g/cm$^3$, and (b) from 0.1 to 10 wt %, based on the total weight of the blend, of an ionomer.

By "ionomer" is meant a polymeric composition obtained by the introduction of acidic groups at molar concentrations below 10% into an addition polymer, followed by partial neutralization with metal cations or amines, such as a compound of the monovalent, divalent and/or trivalent metals of Group I, II, IV-A and VIIIB of the periodic table of the elements.

Preferred ionomers are derived from a copolymer of at least one alpha-olefin and at least one ethylenically unsaturated carboxylic acid and/or anhydride. Suitable alpha-olefins include ethylene, propylene, 1-butene, 1-pentene, 1-hexene, 1-heptene, 3-methylbutene, and the like. Suitable carboxylic acids and anhydrides include acrylic acid, methacrylic acid, ethacrylic acid, maleic acid, fumaric acid, maleic anhydride, and the like. The foregoing copolymers generally contain from about 0.2 to about 10 mole percent, and preferably from about 0.5 to about 8 mole percent, carboxylic acid groups.

Particular examples of such copolymers include ethylene-maleic anhydride copolymers, ethylene-acrylic acid copolymers, ethylene-methacrylic acid copolymers, ethylene-itaconic acid copolymers, ethylene-methyl hydrogen maleate copolymers, ethylene-maleic acid copolymers, ethylene-acrylic acid copolymers, ethylene-methacrylate copolymers, ethylene-methacrylic acid-ethacrylate copolymers, ethylene-itaconic acid-methacrylate copolymers, ethylene-itaconic acid-methacrylate copolymers, ethylene-methyl hydrogen maleate-ethyl acrylate copolymers, ethylene-methacrylic acid-vinyl acetate copolymers, ethylene-acrylic acid copolymers, ethylene-acrylic acid-vinyl alcohol copolymers, ethylene-acrylic acid-carbon monoxide copolymers, ethylene-propylene-acrylic acid copolymers, ethylene-methacrylic acid-acrylonitrile copolymers, ethylene-fumaric acid-vinyl methyl ether copolymers, ethylene-vinyl chloride-acrylic acid copolymers, ethylene-vinylidene chloride-acrylic acid copolymers, ethylene-vinylidene chloride-acrylic acid copolymers, ethylene-vinyl fluoridemethacrylic acid copolymers and ethylene-chlorotrifluoroethlyene-methacrylic acid copolymers.

Preferred ionomers are obtained by reacting the foregoing copolymers with a sufficient amount of metal ions as to neutralize at least some portion of the acid groups, preferably at least about 5 percent by weight and preferably from about 20 to about 100 percent by weight, of the acid groups present. Suitable metal ions include $Na^+$, $K^+$, $Li^+$, $Cs^+$, $Rb^+$ $Hg^+$, $Cu^+$, $Be^{++}$, $Mg^{++}$, $Ca^{++}$, $Sr^{++}$, $Cu^{++}$, $Cd^{++}$, $Hg^{++}$, $Sn^{++}$, $Pb^{++}$, $Fe^{++}$, $Co^{++}$, $Ni^{++}$, $Zn^{++}$, $Al^{+++}$, $Sc^{+++}$ and $Ye^{+++}$. Preferred metals suitable for neutralizing the copolymers used herein are the alkali metals, particularly cations such as sodium, lithium and potassium and alkaline earth metals, and in particular cations such as calcium, magnesium and zinc. One or more ionomers may be used in the present invention.

Preferred ionomers include Surlyn® ionomers, such as zinc or sodium salts of an ethylene and methacrylic acid copolymer. Surlyn® ionomers may be obtained from E.I. Dupont de Nemours & Company, Wilmington, Del.

Other preferred ionomers include Priex® ionomers, available from Solvay, which are metal salts of an ethylene and grafted-maleic anhydride copolymer.

The preferred quantity of ionomer in the blend is between 0.5 and 6 wt % based on the total weight of the blend, more preferably between 1 and 5 wt %.

Generally for all embodiments of the polyethylene resin utilised in the invention, the low molecular weight fraction of the resin preferably has a density of from 0.970 to 0.990 g/cm³, more preferably from 0.971 to 0.980 g/cm³, and an $MI_2$ from 200 to 1000 g/10 min, more preferably from 300 to 1000 g/10 min.

Preferably, for the high molecular weight fraction, the density is from 0.908 to 0.930 g/cm³, more preferably from 0.912 to 0.928 g/cm³ and particularly from 0.915 to 0.922 g/cm³. The HLMI is preferably from 0.001 to 0.5 g/10 min, more preferably from 0.01 to 0.35 g/10 min, with most preferred ranges from 0.02 to 0.15 g/10 min and more particularly from 0.02 to 0.1 g/10 min.

In this specification the melt index $MI_2$, $MI_5$ and high load melt index HLMI are measured in accordance with ASTM D-1238 at 190° C. with respective loads of 2.16, 5 and 21.6 kg. For $MI_2$, this standard requires an 8/2 die (8 mm length and 2.095 mm internal diameter), although for convenience measurements have also been made using an 8/1 die (8 mm length and 1.0 mm internal diameter), which gives much lower values—slightly more than 0.05 of those with the 8/2 die. In this specification the density is measured in accordance with ISO 1183.

For the low molecular weight polyethylene fraction, the polydispersity index D (represented by the ratio Mw/Mn as determined by gel permeation chromatography (GPC)) is preferably from 2 to 6. For the linear low density polyethylene fraction of high molecular weight the value of polydispersity index D is preferably from 2 to 6. Preferably, the overall polyethylene resin has a molecular weight distribution Mw/Mn from 8 to 40.

Preferably, the high molecular weight fraction is a copolymer of ethylene and another alpha-olefin containing from 3 to 12 carbon atoms. More preferably, it is a copolymer of ethylene and butene, methylpentene, hexene and/or octene.

Preferably, the low molecular weight fraction is an ethylene homopolymer.

In one embodiment of the present invention, the polyethylene resin preferably comprises from 35 to 49 wt % of a first polyethylene fraction of high molecular weight, and from 51 to 65 wt % of a second polyethylene fraction of low molecular weight, the first polyethylene fraction comprising a linear low density polyethylene having a density of up to 0.928 g/cm³ and an HLMI of less than 0.6 g/10 min, and the second polyethylene fraction comprising a high density polyethylene having a density of at least 0.969 g/cm³ and an $MI_2$ of greater than 100 g/10 min, and the polyethylene resin having a density of greater than 0.940 g/cm³ and an HLMI of from 1 to 100 g/10 min.

In this embodiment, the resin utilised in the blend with the ionomer preferably comprises at least 55 wt % of the second polyethylene fraction of low molecular weight, most preferably at least 56 wt %. It preferably comprises not more than 45 wt % of the first polyethylene fraction of high molecular weight, more preferably at most 44 wt %.

Preferably in this embodiment, the density of the polyethylene resin utilised in the blend is from 0.952 to 0.960 g/cm³, more preferably from 0.954 to 0.958 g/cm³. This density is for the natural resin, although in use the resin may additionally contain carbon black pigment, which increases the density. Its HLMI is preferably from 5 to 90 g/10 min, more preferably from 10 to 80 g/10 min.

In another preferred embodiment of the invention, the polyethylene resin comprises from 44 to 56 wt % of a high molecular weight polyethylene fraction, and from 44 to 56 wt % of a low molecular weight polyethylene fraction;

the high molecular weight polyethylene fraction comprising a linear low density polyethylene having a density of from 0.913 to 0.923 g/cm³, and an HLMI of from 0.02 to 0.2 g/10 min;

and the low molecular weight polyethylene fraction comprising a high density polyethylene having a density of at least 0.969 g/cm³ and an $MI_2$ of greater than 100 g/10 min, wherein the relationship between the density D of the resin in g/cm³ and the weight fraction of the low molecular weight fraction $P_1$ is defined by $0.055P_1+0.916<D<0.034P_1+0.937$.

In this embodiment, the density D of the polyethylene resin is preferably at least 0.945 g/cm³, more preferably from 0.945 to 0.955 g/cm³, and particularly from 0.948 to 0.954 g/cm³. It is also preferred that the relationship between the density D of the resin in g/cm³ and the weight fraction of the low molecular weight fraction $P_1$ is defined by $0.055P_1+0.919<D<0.034P_1+0.939$.

In this embodiment, the polyethylene resin preferably comprises less than 54% by weight of the second polyethylene fraction of low molecular weight, most preferably between 48 and 53 weight %. It preferably comprises at least 46% by weight of the first polyethylene fraction of high molecular weight, most preferably at least 47 weight %. Its HLMI is preferably from 3 to 50 g/10 min, more preferably from 5 to 25 g/10 min.

The present invention further provides the use of a blend of a polyethylene resin as defined above and an ionomer for the manufacture of pressure pipes and fittings, and in a further aspect a pressure pipe or a fitting comprising the blend of the invention.

The present inventors have found that the pressure pipe resins produced in accordance with the invention exhibit a better creep resistance at low temperature than the currently obtainable PE 100 type resins while maintaining good slow crack growth resistance and impact strength. The resins according to the invention are therefore well suited for the manufacture of high pressure pipes and fittings. When used for the manufacture of pipes, the resins are most often blended with usual additives such as antioxidants, anti-acids and colourants.

The pipe resins of the invention show good creep resistance. Creep resistance is typically measured according to ISO 1167 on 32 mm diameter SDR11 pipes to determine the lifetime prior to failure at a temperature of 20° C. and a stress of 13 MPa, 13.7 or 13.9 MPa.

The polyethylene resins utilised in the invention can themselves be prepared by different methods, such as melt blending, reactor in series configuration or single reactor with dual site catalysts. Preferably, the high density and low density fractions of the polyethylene resin are produced in at least two separate reactors, most preferably two such reactors in series. In such a case, the high density fraction is preferably prepared first, so that the low density fraction is prepared in the presence of the high density fraction. The resultant resin has a bimodal molecular weight distribution. The catalyst employed in the polymerisation process may be any catalyst(s) suitable for preparing the low and high density fractions. Preferably, the same catalyst produces both the high and low molecular weight fractions. For example, the catalyst may be a chromium catalyst, a Ziegler-Natta catalyst, a metallocene catalyst or a transition metal catalyst. Using a Ziegler catalyst, the polyethylene resins may be made as described in EP 897934A; using a metallocene catalyst, they may be made as described in the aforementioned WO 02/34829, or copending application EP 02076729.9.

The resins may be made using a metallocene catalyst system, which is preferably a bis-tetrahydroindenyl compound (THI). The use of such catalysts enables the production of both low and high density fractions having narrow molecular weight distributions. Preferably the catalyst system comprises (a) a metallocene catalyst component comprising a bis-tetrahydroindenyl compound of the general formula $(IndH_4)_2R''MQ_2$ in which each $IndH_4$ is the same or different and is tetrahydroindenyl or substituted tetrahydroindenyl, R'' is a bridge which comprises a $C_1$-$C_4$ alkylene radical, a dialkyl germanium or silicon or siloxane, or an alkyl phosphine or amine radical, which bridge is substituted or unsubstituted, M is a Group IV metal or vanadium and each Q is hydrocarbyl having 1 to 20 carbon atoms or halogen; and (b) a cocatalyst which activates the catalyst component.

With the preferred bis-tetrahydroindenyl catalyst, each bis-tetrahydroindenyl compound may be substituted in the same way or differently from one another at one or more positions in the cyclopentadienyl ring, the cyclohexenyl ring and the ethylene bridge. Each substituent group may be independently chosen from those of formula $XR_v$ in which X is chosen from group IVB, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or $CH_3$. More preferably, at least one and most preferably both cyclopentadienyl rings are unsubstituted.

In a particularly preferred embodiment, both indenyls are unsubstituted.

R'' is preferably an ethylene bridge which is substituted or unsubstituted.

The metal M is preferably zirconium, hafnium or titanium, most preferably zirconium. Each Q is the same or different and may be a hydrocarbyl or hydrocarboxy radical having 1-20 carbon atoms or a halogen. Suitable hydrocarbyls include aryl, alkyl, alkenyl, alkylaryl or aryl alkyl. Each Q is preferably halogen. Ethylene bis(4,5,6,7-tetrahydro-1-indenyl) zirconium dichloride is a particularly preferred bis tetrahydroindenyl compound of the present invention.

The metallocene catalyst component used to produce the polyethylene resin utilised in the present invention can be prepared by any known method. A preferred preparation method is described in J. Organomet. Chem. 288, 63-67 (1985).

The cocatalyst which activates the metallocene catalyst component can be any cocatalyst known for this purpose such as an aluminium-containing cocatalyst, a boron-containing cocatalyst or a mixture of those. The aluminium-containing cocatalyst may comprise an alumoxane, an alkyl aluminium and/or a Lewis acid.

Alternative preferred metallocene complexes for use in the preparation of the polyethylene resins used in the present invention may be represented by the general formula:

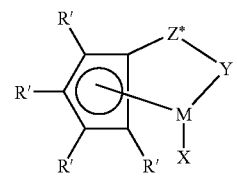

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene; s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R'')— or —P(R'')— wherein R'' is $C_{1-10}$ hydrocarbyl.

Most preferred complexes are amidosilane—or amidoalkanediyl complexes.

Most preferred complexes are those wherein M is titanium.

Specific complexes suitable for use in the preparation of the supported catalysts of the present invention are those disclosed in WO 95/00526 and are incorporated herein by reference.

A particularly preferred complex is (t-butylamido) (tetramethyl-$\eta^5$-cyclopentadienyl)dimethyl silanetitanium-T$\eta^4$-1.3-pentadiene.

Ionomers such as those utilised in the present invention are commercially available, and may thus be made by well-known methods. An example of such a process is described in EP 1177229A.

The polyethylene resins are blended with ionomers by known methods. Typically, flakes of the polyethylene resin and ground ionomer pellets are blended in an extruder and then pelletised.

BRIEF DESCRIPTION OF THE DRAWINGS

The invention will now be described in further detail with reference to the following non-limiting Examples and drawings, in which:

FIG. 1 is a graph showing Tensile creep @ 23° C.—constant applied stress=12 MPa;

FIG. 2 is a graph showing Tensile creep @ 40° C.—constant applied stress=8.9 MPa; and FIG. 3 is a graph showing Tensile creep @ 40° C.—constant applied stress=9.2 MPa.

EXAMPLES

Preparation of Blends

Blends of an ionomer resin and three polyethylene resins were prepared. The ionomer resin was a zinc salt of an ethylene and maleic anhydride graft copolymer. The base polyethylene resin used for the preparation of the ionomer was of a textile grade typically having a density of 944 kg/m$^3$ and an MI$_2$ of 3.5 g/10 min, and the maleic anhydride-grafted copolymer had a density of 945 kg/m$^3$, an MI$_5$ of 0.12 g/10 min and an HLMI of about 9 g/10 min. The zinc content of the ionomer was 48.9 meq/kg [meq=milli-equivalent], corresponding to a theoretical neutralisation level of about 127%. Similar ionomers are available from Solvay SA under the trade name Priex®.

The above ionomer was blended either with the natural fluff of a commercial Ziegler polyethylene pipe resin (resin A) available from BP Solvay as Eltex® 120N2025 made according to the general procedure described in EP 897934A, or with a second polyethylene resin (resin B or C) made using a metallocene catalyst, ethylene bis(4,5,6,7-tetrahydro-1-indenyl) zirconium dichloride, according to the general procedure described in WO 02/34829. The polyethylene resins were bimodal resins having the general properties shown in Tables 1-3 below. The density of the polyethylene is measured according to ISO 1183. HLMI is measured using the procedures of ASTM D-1238 at 190° C. using a load of 21.6 kg. MI$_2$ (8/2) is measured using the procedures of ASTM D-1238 at 190° C. using a load of 2.16 kg, whilst MI$_2$ (8/1) is measured using a smaller die as previously explained. Density measurement on blends with Ziegler resin A have shown that density of the blends does not change at levels of up to 20% weight of ionomer.

TABLE 1

| Ziegler resin A | | | |
|---|---|---|---|
| Bimodal resin | MI$_5$ | g/10 min | 0.41 |
| | HLMI | g/10 min | 11.8 |
| | Density | kg/m$^3$ | 950.6 |
| | SCB | Et/1000 C | 2.9 |

TABLE 2

| Metallocene resin B | | | |
|---|---|---|---|
| 1st block | MI$_{2.16}$ (8/2) | g/10 min | 837 |
| | Density | kg/m$^3$ | 974.5 |
| | p1 | % | 0.60 |
| 2nd block | HLMI | g/10 min | 0.02 |
| | SCB | C6/1000 C | 3.0 |
| | Density | kg/m$^3$ | 919.2 |
| | p2 | % | 0.40 |
| Bimodal resin | MI$_5$ | g/10 min | 0.18 |
| | HLMI | g/10 min | 8.9 |
| | Density | kg/m$^3$ | 954.2 |

TABLE 3

| Metallocene resin C | | | |
|---|---|---|---|
| 1st block | MI$_{2.16}$ (8/1) | g/10 min | 39.7 |
| | Density | kg/m$^3$ | 974.3 |
| | p1 | % | 0.56 |
| 2nd block | HLMI | g/10 min | 0.02 |
| | SCB | C6/1000 C | 2.0 |
| | Density | kg/m$^3$ | 920.0 |
| | p2 | % | 0.44 |
| Bimodal resin | MI$_5$ | g/10 min | 0.18 |
| | HLMI | g/10 min | 7.1 |
| | Density | kg/m$^3$ | 953.0 |

The blending of the ionomer and polyethylene resins was carried out in a lab-scale extruder (APV Baker under the trade name MP19TC25) at ~210° C., under nitrogen. A number of different blends were prepared, containing respectively 0%, 1.5%, 5%, 10%, and 20% ionomer plus the usual additives. The blends were then pelletized. Compositions of the blends are shown in Tables 4 to 6 below.

TABLE 4

| Blend 1: ionomer + Ziegler resin A | |
|---|---|
| Irganox B225 | 3.5 |
| Zn stearate (g/kg) | 0.75 |
| Ca stearate (g/kg) | 0.25 |

TABLE 5

| Blend 2: ionomer + metallocene resin B | |
|---|---|
| Irganox B225 | 3.5 |
| Zn stearate (g/kg) | 0 |
| Ca stearate (g/kg) | 0 |

TABLE 6

| Blend 3: ionomer + metallocene resin C | |
|---|---|
| Irganox B225 | 3.5 |
| Zn stearate (g/kg) | 0 |
| Ca stearate (g/kg) | 0 |

Evaluation of Blends

For mechanical tests, pellets were compression-moulded into plaques at 1-5° C./min.

Solid-State Creep Resistance

Creep tests were performed on a Franck (manufacturer) test rig designed for the purpose, although other makes of equipment would be suitable. Each creep station was equipped with an extensometer for strain measurements, placed in a temperature-controlled room. Creep test samples (in the shape of "dogbones") were formed from compression moulded rectangular plaques having a nominal thickness of about 2 mm. The dimension of the dogbone test bars was in accordance with ISO 527-2. The compression moulding conditions for the plaques were in accordance with ASTM D1928. Fixed loads were calculated to give a target stress based upon the dimensions of the specimen before loading, and were applied either directly or via a lever arm system. In the testing, creep behaviour was monitored using an extensometer, and the percentage deformation over time recorded at a specific temperature and stress (23° C./12 MPa for resin A, 40° C./8.9 MPa for resin B, 40° C./9.2 MPa for resin C). The results for the three blends are shown in FIGS. 1 to 3, where it can be seen that addition of small amounts of ionomer results in a significant improvement, with the improvement being smaller at larger ionomer levels.

The invention claimed is:

1. Pressure pipe resin comprising from 90 to 99.9 wt %, based on the total weight of the resin, of a polyethylene comprising from 35 to 60 wt % of a high molecular weight fraction having a density of up to 0.930 g/cm$^3$ and from 40 to 65 wt % of a low molecular weight fraction having a density of at least 0.965 g/cm$^3$, and from 0.1 to 10 wt %, based on the total weight of the resin, of an ionomer, which resin has an extrapolated 20° C./50 years stress at a 97.5% confidence level of at least 10 MPa (PE 100) according to ISO 9080.

2. Pressure pipe resin according to claim 1, wherein the quantity of ionomer in the resin is between 0.5 and 6 wt % based on the total weight of the blend.

3. Pressure pipe resin according to claim 2, wherein the quantity of ionomer in the resin is between 1 and 2 wt % based on the total weight of the blend.

4. Pressure pipe resin according to claim 1, wherein the ionomer has a polyethylene backbone and has a density of at least 0.930 g/cm$^3$.

5. Pressure pipe resin according to claim 1, wherein the ionomer is a grafted metal salt of an ethylene and maleic anhydride copolymer.

6. Pressure pipe resin according to claim 1, wherein the polyethylene resin comprises from 35 to 49 wt % of a first polyethylene fraction of high molecular weight, and from 51 to 65 wt % of a second polyethylene fraction of low molecular weight, the first polyethylene fraction comprising a linear low density polyethylene having a density of up to 0.928 g/cm$^3$ and an HLMI of less than 0.6 g/10 min, and the second polyethylene fraction comprising a high density polyethylene having a density of at least 0.969 g/cm$^3$ and an MI$_2$ of greater than 100 g/10 min, and the polyethylene resin having a density of greater than 0.940 g/cm$^3$ and an HLMI of from 1 to 100 g/10 min.

7. Pressure pipe comprising a resin as defined in claim 1.

* * * * *